Feb. 27, 1923.

F. C. BAIRD ET AL

LOCKING DIFFERENTIAL

Filed May 1, 1922

Frank C. Baird,
William S. Baird,
Inventors,
Deloz G. Haynes,
Attorney

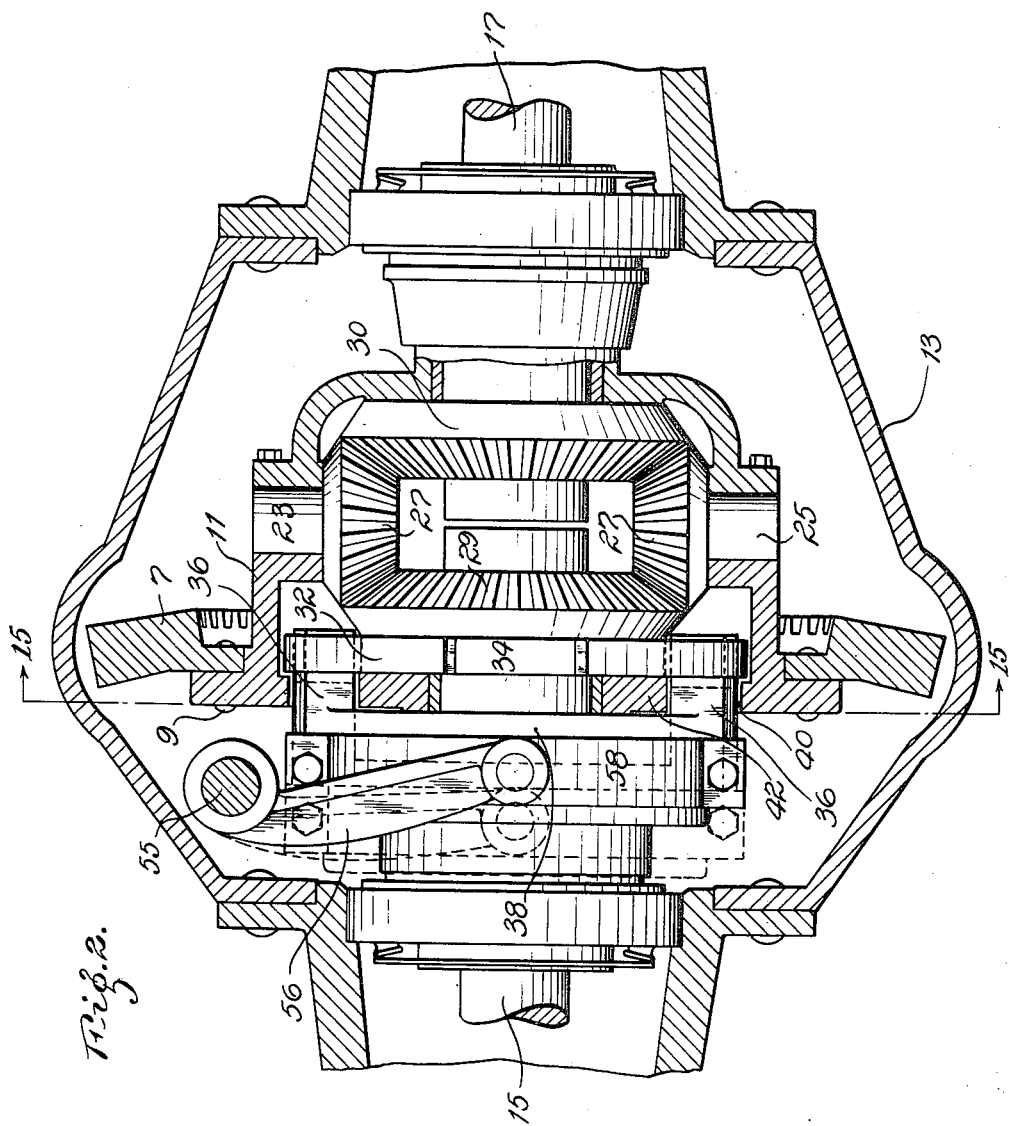

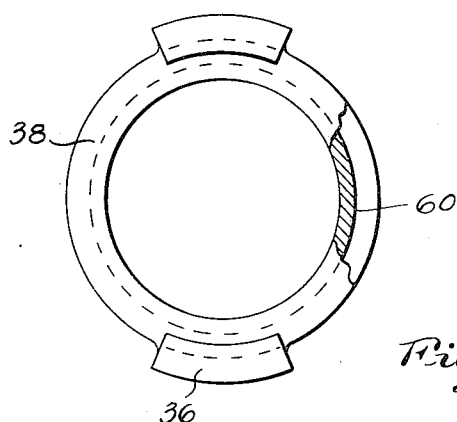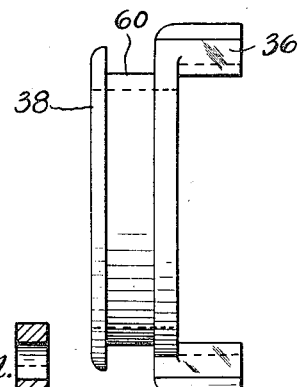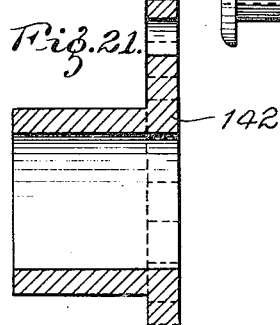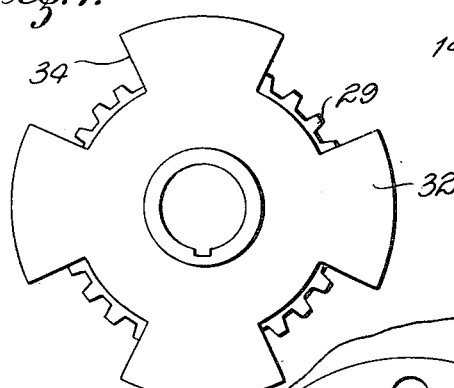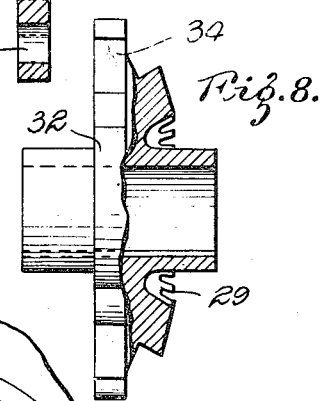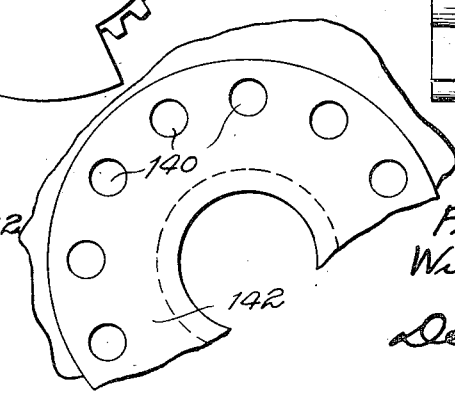

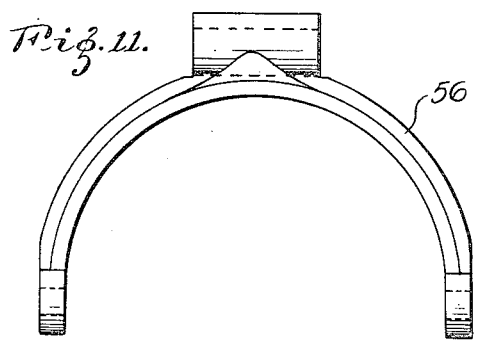
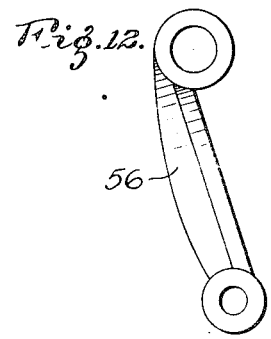
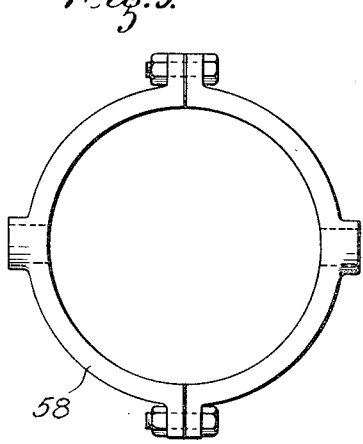
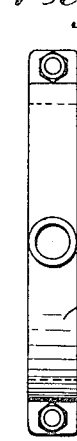
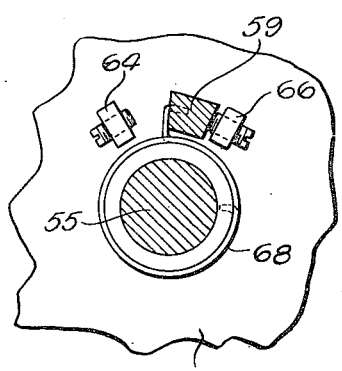
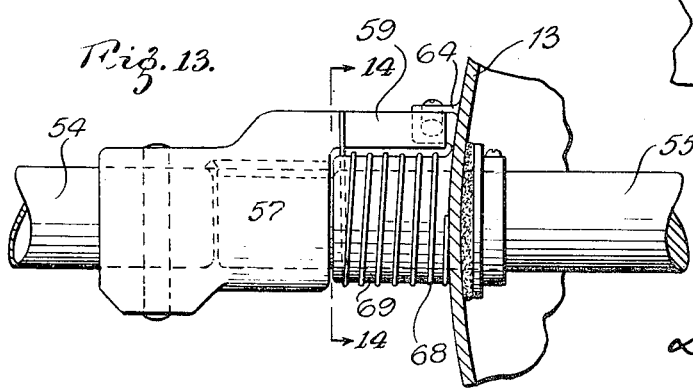

Feb. 27, 1923. 1,447,116
F. C. BAIRD ET AL
LOCKING DIFFERENTIAL
Filed May 1, 1922 5 sheets-sheet 5
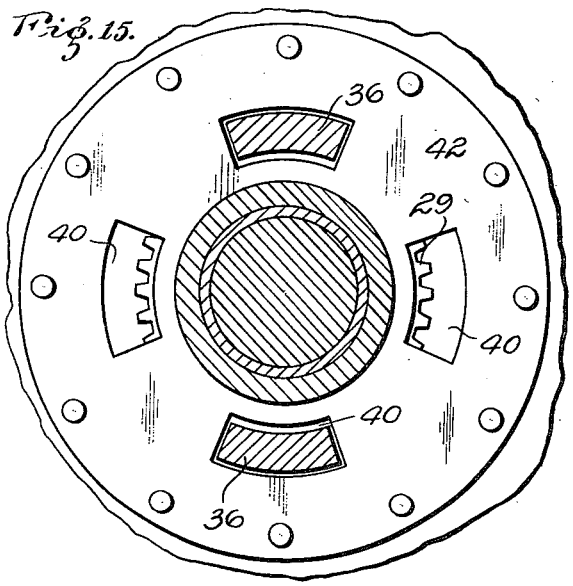
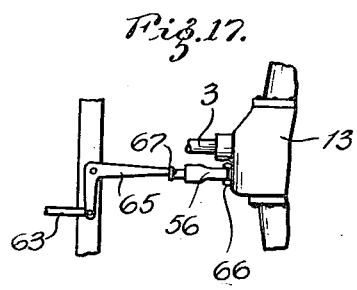
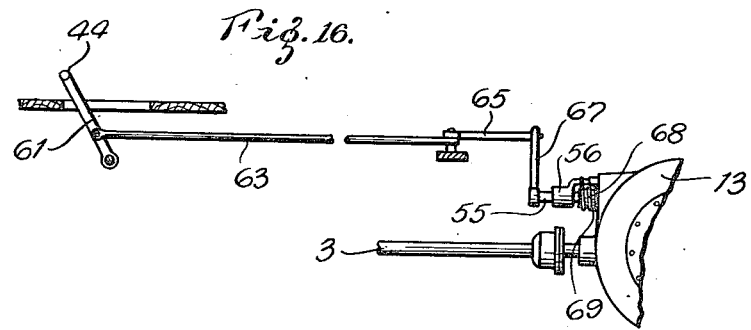
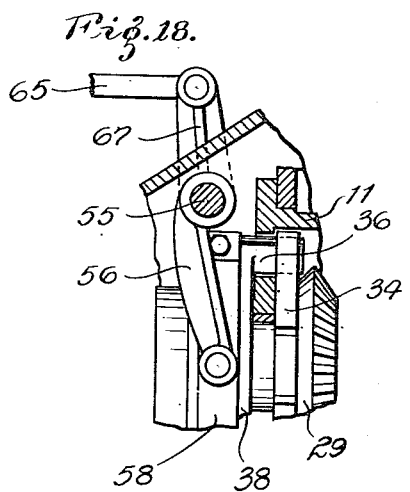
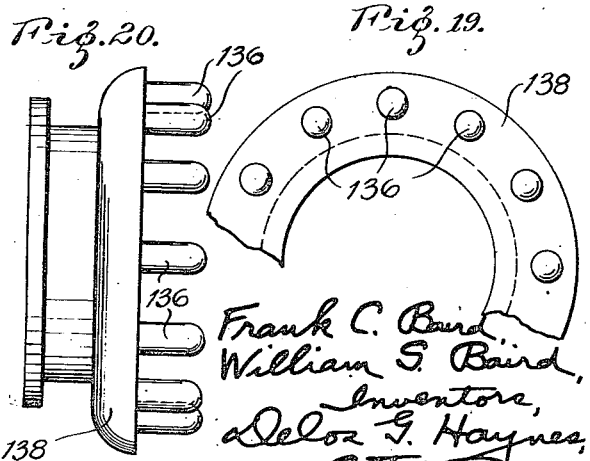

Patented Feb. 27, 1923.

1,447,116

UNITED STATES PATENT OFFICE.

FRANK C. BAIRD, OF CHAMPAIGN, AND WILLIAM S. BAIRD, OF DECATUR, ILLINOIS, ASSIGNORS TO THE BAIRD COMPANY, OF CHAMPAIGN, ILLINOIS, A CORPORATION OF ILLINOIS.

LOCKING DIFFERENTIAL.

Application filed May 1, 1922. Serial No. 557,613.

*To all whom it may concern:*

Be it known that we, FRANK C. BAIRD and WILLIAM S. BAIRD, both citizens of the United States, and, respectively, residents of Champaign, Champaign County, Illinois, and Decatur, Macon County, Illinois, have invented an Improvement in Locking Differentials, of which the following is a specification.

This invention relates to automotive vehicles, and with regard to certain more specific features, to a differential locking mechanism.

Among the several objects of the invention may be noted the provision of a simple and durable device for locking differentially driven wheels of an automotive vehicle.

Other objects will be in part obvious and in part pointed out hereinafter.

The invention accordingly consists of the elements and combinations of elements, features of construction, and arrangements of parts which will be exemplified in the structures hereinafter described and the scope of the application of which will be indicated in the following claims.

In the accompanying drawings, in which are shown two or more of various possible embodiments of the invention, Fig. 1 is a diagrammatic plan of a portion of an automobile, showing the present invention applied thereto;

Fig. 2 is a vertical transverse section on the line 2—2 of Fig. 1, viewed from the rear, showing in solid lines the parts locked, and in dotted lines the parts unlocked;

Fig. 3 is a vertical longitudinal section on the line 3—3 of Fig. 1, viewed from the left side;

Fig. 4 is a vertical transverse section on the line 4—4 of Fig. 1, viewed from the rear;

Fig. 5 is a face view of a locking member;

Fig. 6 is a side elevation thereof;

Fig. 7 is a face view of an element keyed upon the shaft that drives the left wheel;

Fig. 8 is a side elevation of Fig. 7, with parts in section;

Fig. 9 is a face view of a collar;

Fig. 10 is a side elevation thereof;

Fig. 11 is a face view of a yoke;

Fig. 12 is a side elevation thereof;

Fig. 13 is a fragmentary longitudinal elevation of a coupling, viewed from the left side;

Fig. 14 is a vertical transverse section on the line 14—14 of Fig. 13, viewed from the front;

Fig. 15 is a vertical longitudinal section on the line 15—15 of Fig. 2, viewed from the left side;

Fig. 16 is a fragmentary left side elevation of a modified form of drive from the pedal to the clutch yoke;

Fig. 17 is a plan of a part of Fig. 16;

Fig. 18 is a fragmentary vertical transverse section similar to Fig. 2, showing the embodiment illustrated in Figs. 16 and 17;

Fig. 19 is a face view of a modified form of movable member of the clutch;

Fig. 20 is a side elevation thereof;

Fig. 21 is a sectional view of a portion of the differential housing adapted to cooperate with the part illustrated in Fig. 19;

Fig. 22 is a side elevation thereof;

Fig. 23 is a face view of a modified form of the element keyed upon the shaft that drives the left wheel and is adapted to cooperate with the parts illustrated in Figs. 19 to 22; and Fig. 24 is a side elevation of Fig. 23.

Similar reference characters indicate corresponding parts throughout the several views of the drawings.

Referring to Figs. 1 to 15 of the accompanying drawings, and more particularly to Figs. 1 and 2, there is illustrated an automobile 1 having an engine (not shown) driving the shaft 3. Fixed upon the engine shaft 3 is a bevel gear 5 (Fig. 1) meshing with and driving the ring gear 7 (Figs. 1 and 2). As indicated in Fig. 2, this ring gear is riveted as at 9, to a differential housing 11 which is rotatably mounted within the stationary housing 13 which may be termed the axle housing.

Rotation of the engine shaft thus causes rotation of the differential housing 11.

Rotatably mounted within the differential housing are a pair of axles 15, 17, extending respectively to the left and right rear wheels 19, 21 of the vehicle.

Mounted upon stud shafts of which two are illustrated at 23, 25 (Fig. 2) carried by the differential housing 11 are compensating gears, two of which are illustrated in Fig. 2. Two or four or other convenient number of these gears may be provided.

Keyed upon the respective axles 15, 17 and meshing with the compensating gears 27 are the left and right driven gears 29, 30.

The elements thus far described serve as the drive between the engine shaft and the wheels, and permit differential rotation of the wheels.

At times it is desirable to prevent this differential rotation of the wheels. For example, when one of the rear wheels is in a position where due to mud or other cause it has insufficient traction to propel the vehicle, it is advantageous to lock the differential mechanism and thus utilize the other rear wheel in propelling the vehicle.

To this end, manually operated means are provided for locking one of the axles (in this instance the left axle) to the differential housing. A preferred embodiment of the invention is illustrated in Figs. 1 to 15, in which the left driven gear 29 (shown in detail in Figs. 7 and 8) is illustrated as provided with the disc 32 having segmental portions cut away as indicated at 34 (Fig. 7).

Into these notches 34 extend, at times, a suitable number of segmental lugs 36 carried upon or integral with the shiftable locking member 38 (Figs. 2, 5 and 6) of the clutch that serves to lock the differential housing to the disc 32 on the left driven shaft 15. When this locking member 38 is in its right-hand or locked position, illustrated in solid lines in Fig. 2, the segmental lugs 36 thereon extend through apertures 40 (Figs 2 and 15), in what may be termed the partition wall 42 of the differential housing and thence through the notches 34 in the disc 32.

When the locking member 38 is in its left-hand or unlocked position, indicated in dotted lines in Fig. 2, the segmental lugs 36 still extend through the apertures 40 in the partition wall of the differential housing, and therefore the locking member 38 still rotates with the differential housing, but the segmental lugs on the locking member are to the left of the left face of the disc 32 and are out of engagement therewith.

Thus by locking the slidable member from its left-hand or unlocked position shown in dotted lines in Fig. 2, to its right-hand or locked position indicated in solid lines, the segmental lugs engage the left driven gear and lock it to the differential housing. This acts to compel both axles to rotate at the same speed as the differential housing. If when the locking member is being moved toward the right, the right-hand ends of the segmental lugs do not register at once with the notches 34, such registration will occur after a comparatively small angular movement of the differential housing.

The locking member is preferably reciprocated by means of a spring-retracted pedal 44 (Fig. 1) fixed upon a web or plate 46 (Figs. 1 and 4) having a slot 48 into which extends a ball or knob 50 (Figs. 3 and 4) carried upon a rocker arm 52 (Fig. 4) secured to a rock shaft 54 (Figs 1, 2 and 4).

Throughout the drawings, where dotted lines are used they indicate the unlocked position of the several parts, and the analogous adjacent solid lines indicate the locked position of the respective parts.

It will thus be seen from Figs. 1 to 4, that when the operator presses upon the pedal 44 to move it forward (counter-clockwise or to the left, in Fig. 3) the ball or knob 50 is raised, causing the rocker arm 52 and rock shaft or torsion shaft 54 (Figs. 1, 4, 13 and 14) to rotate counter-clockwise (Figs. 2 and 4), and such rotation of the rock shaft 54 rotates the collar 57 (Figs. 13 and 14) secured thereto. The collar 57 carries a lug 59 adapted to oscillate between adjustable stops 64, 66 (Fig. 14) mounted on the axle housing 13. Keyed to the collar 57 is a rock shaft or torsion shaft 55 having bearings 69 upon the axle housing 13. Rotation of the rock shaft 54 counter-clockwise (Figs. 2 and 4) thus rotates the rock shaft 55 and the yoke 56 supported thereby (Figs. 2, 11 and 12) counter-clockwise (Figs. 2 and 12), thereby forcing toward the right (Fig. 2) the ring or collar 58 (Figs. 2, 9 and 10) supported by the yoke. This collar fits into a peripheral groove 60 in the locking member 38 and supports the member 38 and centers it with respect to the partition wall and driven shafts; and by virtue of this connection the rightward movement of the collar causes rightward movement of the rotating locking member 38 splined to the partition wall of the differential housing. The shiftable locking member 38 is thus supported and centered by the axle housing, independently of the elements within said member. The space provided between the shiftable member and said elements prevents binding between them if any relative twisting should occur. The construction, however, is such as to minimize any tendency to twist, because the partition wall 42 and disc 32 are close together; in fact, they abut against one another.

When the operator releases the pedal, the pedal and its associated parts including the locking member 38, are returned to unlocked position by means of the retracting springs 62 (Figs. 1, 3 and 4) and 68 (Figs. 13 and 14). The spring 62 is a torsion spring, one end of which is attached to the fixed shaft 71 upon which the web or bracket 46 is journaled and the other end of which is secured to the bracket 46. The spring 68 is a torsion spring, one end of which is attached to the fixed axle housing 13 and the other end of which is secured to or bears against the lug 59 on the collar 57.

In the modification shown in Figs. 16 to 18, the drive from pedal 44 to rock shaft 55 is shown as comprising a lever 61 carrying the pedal 44 and adapted to move longitudinally forward a rod 63 extending from the pedal lever 61 rearwardly to a bell-crank 65, the oscillation of which causes oscillation of the rocker arm 67 (Fig. 18) carried on the rock shaft 55, which is merely long enough to extend through the rocker arm 67 and yoke 56 and suitable bearings 69.

When the operator presses upon the pedal 44 to move it forward (counter-clockwise, or to the left in Fig. 16), the rod 63 is forced forward, causing the bell-crank 65 to rotate clockwise (Fig. 17), thereby moving the upper half of the rocker arm 67 toward the left of the car, that is, downward in Fig. 17, and leftward or counter-clockwise in Fig. 18. This rotates the rock shaft 55 counter-clockwise (Fig. 18) and such rotation of the rock shaft rotates the yoke 56 (Figs. 2 and 18) counter-clockwise, thereby locking the differential in the manner above described in connection with Fig. 2.

When the operator releases the pedal, the pedal and its associated parts including the locking member 38, are returned to unlocked position by means of the retracting springs 68 (Fig. 16).

Turning now to Figs. 19 to 24, there is illustrated a modified form of clutch. The locking member 138 (Figs. 19 and 20) is analogous to the movable member 38 (Figs. 5 and 6). The differential housing construction (Figs. 21 and 22) differs from the construction shown in Figs. 2 and 15 in that the left central wall 142 of the differential housing is provided with a larger number of apertures 140, registering with the corresponding number of apertures 134 (Figs. 23 and 24) in the disc 132 of the driven gear member 139. In this embodiment of the invention the pins 136 (Figs. 19 and 20) on the locking member 138 cooperate with the apertures 140 in the housing wall and the apertures 134 in the disc, in the same manner that the segmental lugs 36 (Figs. 2 and 6) cooperate with the apertures 40 in a housing wall 42 and the notches 34 in the disc 32. This form of clutch may be used with the rock shaft 54 shown in Figs. 1 to 15 or with the modified drive shown in Figs. 16 to 18.

In view of the above, it is believed that the various features of this invention will be clear without further elaboration, and it will be seen that with the apparatus herein described, the several objects of the invention, are achieved and other advantageous results attained.

As many changes could be made in carrying out the above construction without departing from the scope of the invention, it is intended that all matter contained in the above description or shown in the accompanying drawings shall be interpreted as illustrative and not in a limiting sense.

We claim:

1. In apparatus of the class described, in combination, an automotive vehicle, a differential housing having a partition wall supporting the driving gear and rotated by the engine thereof, driven gears and compensating gears associated with said housing, driven shafts differentially rotated by said gears and housing, a member integral with one of said driven gears and having spaced apertures, and means for locking said housing to said shafts, said means comprising a shiftable member spaced from the elements passing through it and splined to the partition wall of said housing and having projections thereon adapted to engage the apertures in said member, and means for shifting said shiftable member into and out of engagement with said first member.

2. In apparatus of the class described, in combination, an automotive vehicle, a differential housing rotated by the engine thereof, driven and compensating gears associated with said housing, coaxial driven shafts differentially rotated by said housing and gears, a member abutting against a wall of the housing and integral with one of said driven gears and having apertures therein, and means for locking said housing to said shafts, said means comprising a shiftable member coaxially located with respect to said shafts, and spaced from the elements within said shiftable member and in rotatable engagement with said wall of said housing, means on said member adapted to engage the apertures in the first member, and means for axially shifting said shiftable member into and out of engagement with said first member.

3. In apparatus of the class described, in combination, a differential mechanism comprising a driving shaft, a housing adapted to be rotated thereby, a pair of driven shafts journaled in the housing, a gear on each driven shaft, and means for locking the housing to one of the driven shafts, said means comprising a member having means extending through and in engagement with the housing and adapted to be shifted axially into driving engagement with a member abutting against the housing and integral with one of said driven gears, the shiftable member when in such position transmitting rotative movement from the housing to said driven gear, and means for shifting said shiftable member, said last named means comprising a rock shaft mounted on the axle housing and supporting the shiftable member independently of the elements within said shiftable member.

4. In apparatus of the class described, in combination, a differential mechanism comprising a driving shaft, a housing adapted to be rotated thereby, a pair of driven shafts journaled in the housing, a gear on each driven shaft, and means for locking one of the driven shafts to the housing, said means comprising a member supported independently of the differential mechanism and driven shafts and having means extending through and in engagement with the housing and adapted to be shifted axially into driving engagement with a member fixed to one of said driven gears, the shiftable member when in such position transmitting rotative movement from the housing to the driven shaft, and means for shifting said shiftable member.

5. In apparatus of the class described, in combination, a rotatable housing, a driving gear thereon adapted to be driven by the engine of an automotive vehicle, a pair of driven shafts journaled in the housing, a driven gear on each shaft, compensating gears journaled in the housing and meshing with the driven gears, a member fixed to one of the driven gears, a shiftable member splined to the housing and surrounding but spaced from the elements within it and having a peripheral groove and having projections adapted to engage said member and lock said driven gear to the housing, a ring fitting in said groove, a yoke secured to the ring and supporting and centering the ring and shiftable member, means for supporting the yoke, and means for shifting the yoke to shift the shiftable member into and out of locking position.

In testimony whereof, we have signed our names to this specification this 25th/26th day of April, 1922.

FRANK C. BAIRD.
WILLIAM S. BAIRD.